Feb. 10, 1953 K. G. ESCHE 2,627,737
CARRIER ROD CONTROL MECHANISM FOR KNITTING MACHINES
Filed June 23, 1950 5 Sheets-Sheet 1
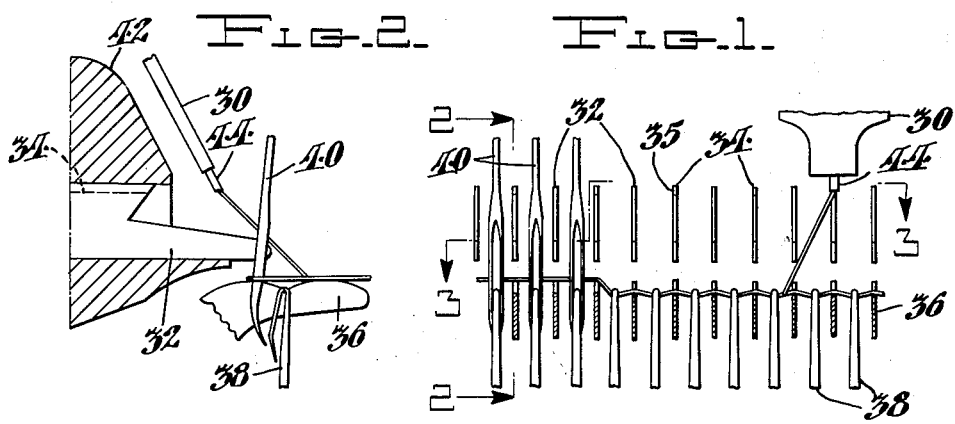
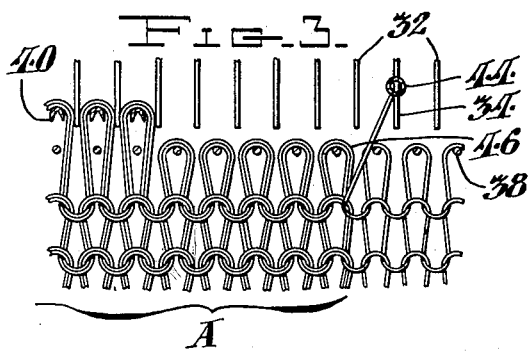
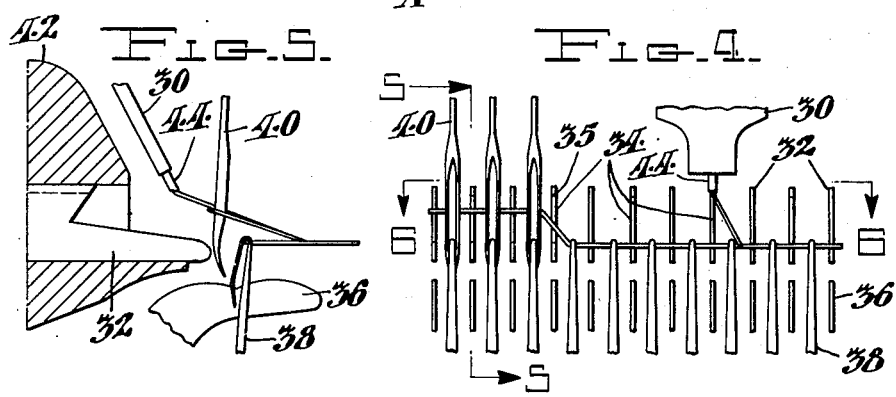
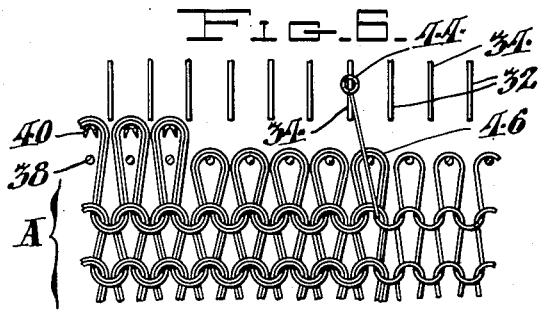
INVENTOR
Kurt G. Esche
BY
ATTORNEY

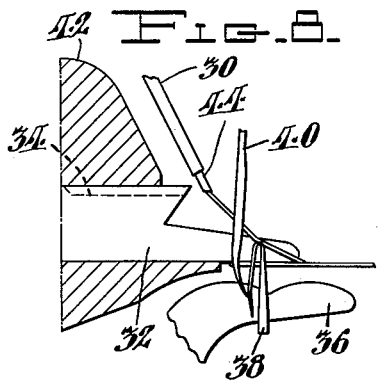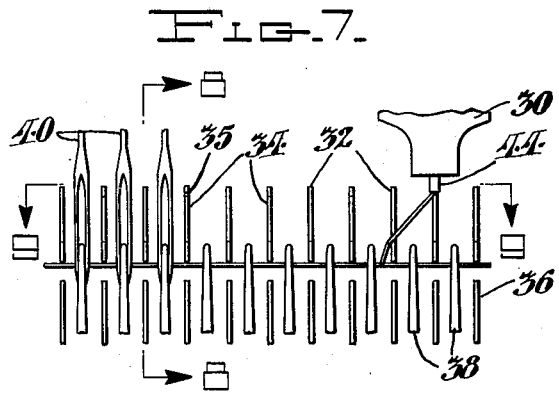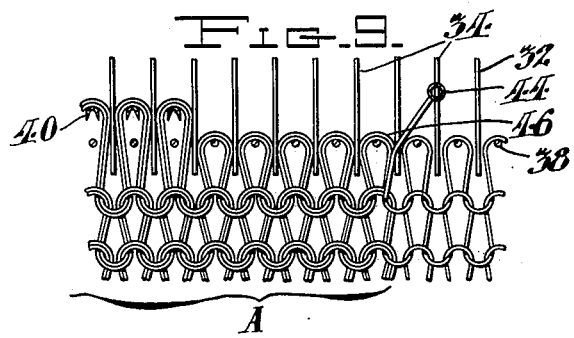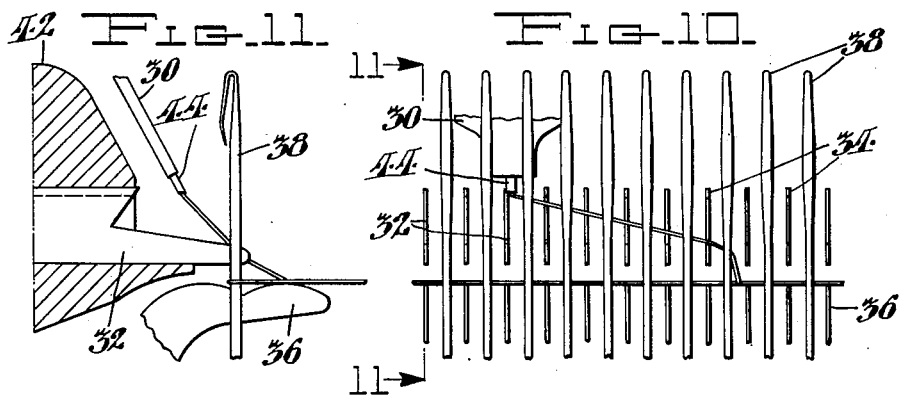

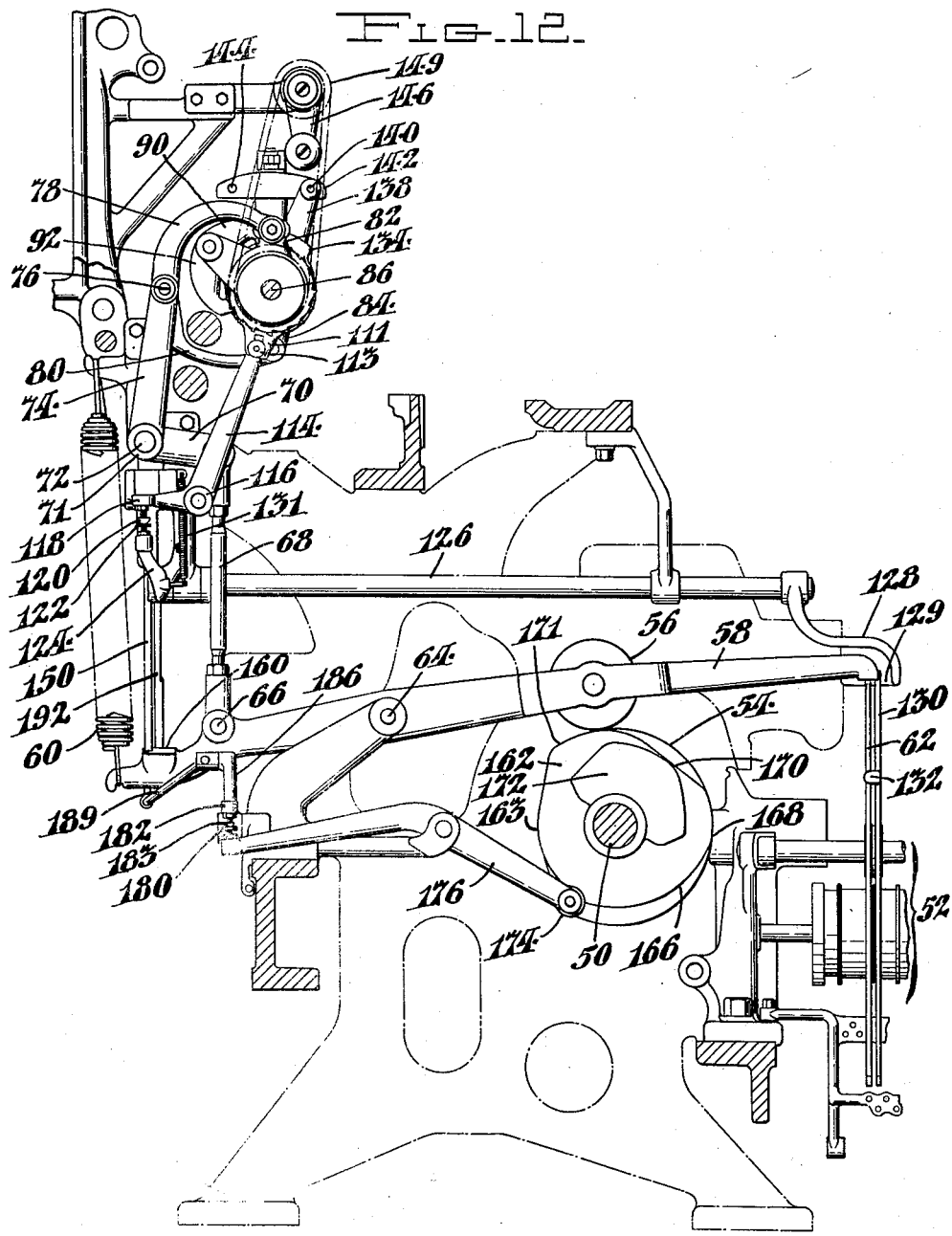

Feb. 10, 1953      K. G. ESCHE      2,627,737
CARRIER ROD CONTROL MECHANISM FOR KNITTING MACHINES
Filed June 23, 1950      5 Sheets-Sheet 4
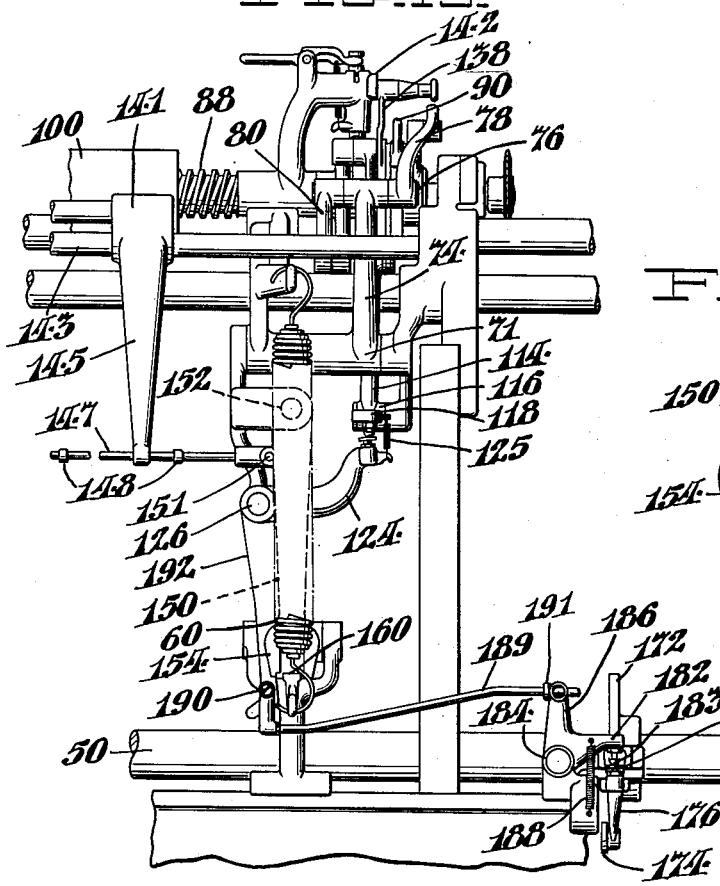
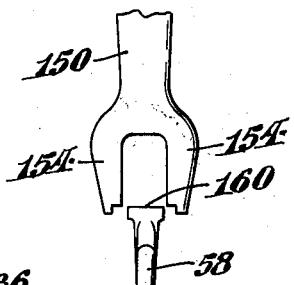
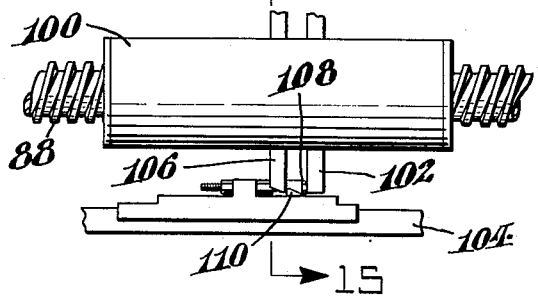
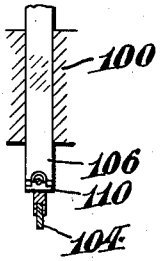
INVENTOR
Kurt G. Esche
BY
ATTORNEY Feb. 10, 1953  K. G. ESCHE  2,627,737
CARRIER ROD CONTROL MECHANISM FOR KNITTING MACHINES
Filed June 23, 1950  5 Sheets-Sheet 5
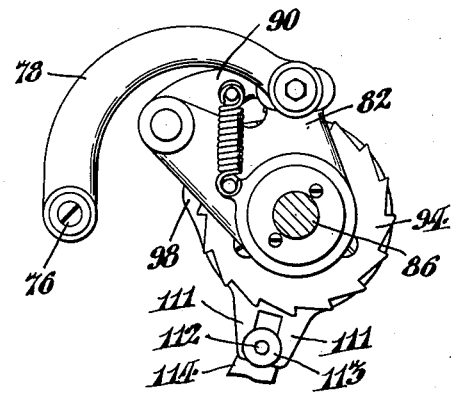
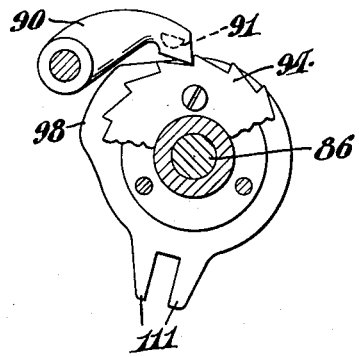
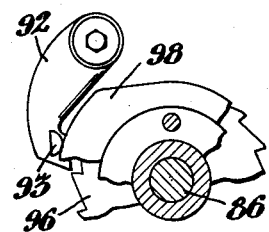
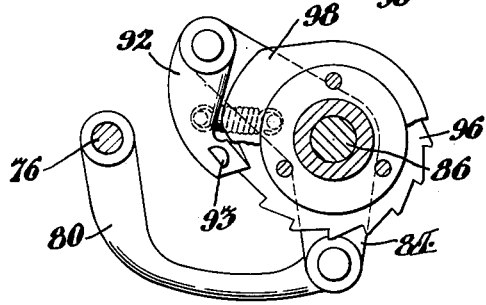
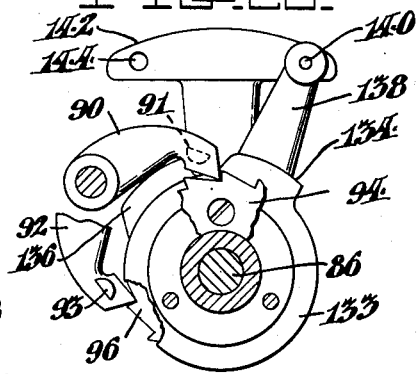
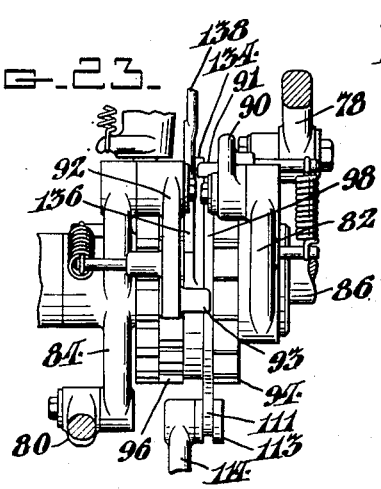
INVENTOR
Kurt G.Esche
BY
ATTORNEY Patented Feb. 10, 1953

2,627,737

UNITED STATES PATENT OFFICE 2,627,737

CARRIER ROD CONTROL MECHANISM FOR KNITTING MACHINES

Kurt G. Esche, Chattanooga, Tenn., assignor, by mesne assignments, to Textile Machine Works, Wyomissing, Pa., a corporation of Pennsylvania Application June 23, 1950, Serial No. 169,852

23 Claims. (Cl. 66—89)

This invention relates to an improved method of making a reinforced fabric and to a machine adapted to carry out the method of making it.

In making full-fashioned stockings, it is the common practise to reinforce certain relatively narrow portions extending along the selvages of parts in which the fabric also needs to be fashioned. Such parts are, for example, the heels and soles of the stockings.

As such reinforcements do not extend the entire width of the stocking it is necessary that the machine for making them be arranged to lay two reinforcing yarns, one along each selvage, the machine in common use having adjustable stops for the carriers for the reinforcing yarn to restrict the reinforcements to the desired areas.

In the fashioning cycles of the full-fashioned type of knitting machine, the sinkers and dividers are operated by different cams than in the knitting cycle and, presumably due to this, a difficulty has developed in that unduly long and therefore unsightly loops have been formed along the inner edges of the fashioned sections of the said reinforced areas, said unsightly loops being caused by a reinforcing yarn accidentally passing under the nose of the next sinker beyond the last needle forming a loop at the inner edge of the reinforced area instead of over the top edge thereof in its extension from the fabric to the yarn delivery tube. This difficulty does not occur in knitting cycles. Neither is it important at the outside selvages because even if it should occur, the objectionable loops will be taken into the seam.

It is an object of this invention to provide a method whereby said difficulty will be prevented from occurring.

A further object of the invention is to provide a machine adapted to carry out said method.

With these and other objects in view, which will become apparent from the following detailed description of the novel method according to the invention and an illustrative embodiment of a novel stop operating mechanism adapted to carry out said method and also according to the invention, the invention resides in the novel steps, combination of steps, novel elements, features of construction and arrangement of parts in cooperative relationship as hereinafter more particularly pointed out in the claims.

In the drawings:

Figure 1 is an elevational detail view, partly in section, diagrammatically showing a yarn carrier for laying reinforcing yarn, and also showing some of the knitting elements and fashioning points of a full-fashioned knitting machine, all in the positions in which they are usually to be found at the point in a fashioning cycle in which certain of the loops are removed from the needles by the fashioning points;

Fig. 2 is a sectional view taken on the line 2—2 of Figure 1, looking in the direction of the arrows and showing a portion of a sinker head;

Fig. 3 is a view taken substantially on the line 3—3 of said Figure 1 with certain of the parts in plan and others in section and showing a section of fabric in addition to said machine elements;

Fig. 4 is a view similar to Fig. 1 but showing the parts in the positions illustrating a further step in a fashioning cycle in accordance with the invention;

Fig. 5 is a sectional view similar to Fig. 2 taken substantially on the line 5—5 of Fig. 4, looking in the direction of the arrows;

Fig. 6 is a view similar to Fig. 3 taken substantially on the line 6—6 of Fig. 4;

Fig. 7 is a view similar to Figs. 1 and 4 and showing the same groups of parts but in the positions illustrating another step in a fashioning cycle in accordance with the invention;

Fig. 8 is a sectional view similar to Figs. 2 and 5 taken substantially on the line 8—8 of Fig. 7 looking in the direction of the arrows;

Fig. 9 is a view similar to Figs. 3 and 6 taken substantially on the line 9—9 of Fig. 7;

Fig. 10 is an elevation similar to Figs. 1, 4 and 7 but not showing the fashioning points, with the yarn carrier and knitting elements in positions immediately following the start of the couliering stroke;

Fig. 11 is a sectional view similar to Figs. 3, 6 and 9 taken substantially on the line 11—11 of Fig. 10, looking in the direction of the arrows;

Fig. 12 is a sectional elevation through a full-fashioned knitting machine having means according to the invention applied thereto, parts not essential to the understanding of the invention being omitted;

Fig. 13 is a rear view of the mechanism as seen from the left of Fig. 12;

Fig. 14 is a view on an enlarged scale diagrammatically showing a yarn carrier and stop mechanism therefor as viewed from the front of the machine or the right of Fig. 12;

Fig. 15 is a section taken substantially on the line 15—15 of Fig. 14 looking in the direction of the arrows;

Fig. 16 is an elevational detail view on an enlarged scale, of certain of the parts shown in Fig.

13, other parts being omitted to give a better disclosure;

Fig. 17 is a detail view on an enlarged scale, of certain of the parts shown at the upper left portion of Fig. 12, parts being omitted for better disclosure;

Fig. 18 is a fragmentary detail view, partially in section, of a portion of Fig. 17, looking in the same direction, parts being omitted, and parts being broken away for purposes of illustration;

Fig. 19 is a detail view of further parts shown at the upper left of Fig. 12, parts being broken away for purposes of illustration;

Fig. 20 is a detail view of other parts shown at the upper left of Fig. 12;

Fig. 21 is a fragmentary view of a portion of Fig. 18, the parts being shown in different relative positions;

Fig. 22 is a detail view similar to a portion of Fig. 19, parts being broken away and shown in different positions relative to Fig. 19; and Fig. 23 is a detail view of certain of the parts shown at the upper portion of Fig. 13, parts being omitted and others shown in section for purposes of illustration.

In the drawings and description, only the method and means necessary to a complete understanding of the invention are specifically set forth; further information as to the construction and operation of other related, usual and well known knitting machine elements, mechanisms, etc., may be found in one or more of the following publications:

1. Pamphlet entitled—Full-Fashioned Knitting Machines—published and copyrighted by the Textile Machine Works, Reading, Pennsylvania, in 1920.

2. Four catalogs entitled—The "Reading" Full-Fashioned Knitting Machine Parts Catalog—published and copyrighted by the Textile Machine Works, in 1929, 1935, 1940 and 1947, respectively.

3. Booklet entitled—The "Reading" High Production Full-Fashioned Knitting Machine—which, forming a supplement to the above noted 1940 Parts Catalog of the Textile Machine Works, is a publication of the Textile Machine Works, copyrighted by the latter in 1940.

4. Pamphlet entitled—Knitting Machine Lectures—published by the Wyomissing Polytechnic Institute, Wyomissing, Pennsylvania, in 1935.

In the ordinary full-fashioned knitting machine, a means is provided for fashioning the fabric in desired places as knitting proceeds. This means comprises points arranged in combs at least one for each selvage, the combs being mounted on rods slidable in brackets held on a narrowing machine whereby the points can contact certain needles including the edge needles and some others to lift loops therefrom. In operation, after the loops are lifted the rods are shifted one or two needle spaces parallel to the needle row and the points contacted with needles in alinement with the new positions of the points to place the loops again on needles of the needle row. For contacting the points with the knitting needles, the narrowing machine includes a front shaft to which said rods are connected, the front shaft being connected to a rear shaft which acts as a pivot to permit the front shaft to move the points toward and away from the needles as required. When desired, the narrowing machine may be raised and held in an inoperative position until needed. When the narrowing machine is in a position from which a narrowing operation may proceed automatically, the front narrowing shaft is in a position in which the lower ends of the fashioning points stand at a level only a little above the level of the highest point of the path of the knitting needles. For supporting the front narrowing shaft in this position, a support rod connects the front shaft to a lever pivoted at one end to the frame and having a cam follower at its other end whereby the lever is able to sustain the weight of the narrowing machine. During ordinary knitting cycles of the machine, said cam follower rests on a cylindrical disc so that the fashioning points are maintained uniformly at a given level. When the cam shaft is shogged or shifted longitudinally of its axis at the beginning of each fashioning cycle of the machine, in the well known manner, the cam followers, including said follower for supporting the narrowing machine, are brought into contact with differently contoured cams, the cam follower for the narrowing machine then travelling on a supporting cam which causes the narrowing machine to dip the proper amount at the proper times to permit the points to engage and remove loops from needles on which they were formed and shift said loops to other needles.

In order to shift the fashioning points at the proper times in the narrowing cycles, oppositely threaded spindles are provided on which are nuts having heads which move the rods and thereby the fashioning points. The spindles are racked predetermined degrees in narrowing cycles by well known means whose activating cams come under cam followers when the cam shaft is shogged.

During the formation or knitting of a course of loops, the yarn carrier is stopped over the next divider beyond the last needle forming a loop so that the trailing end of yarn extending from the end loop to the yarn carrier passes over the nose of the next sinker beyond the end loop. This relation remains unchanged throughout the loop forming cycle inasmuch as the noses of the sinkers and dividers are at no time withdrawn from between the needles while the yarn carrier is stationary. Therefore, upon the return stroke of the yarn carrier, the yarn passes directly around the last needle forming a tight or normal size edge loop both at the outside edges of the fabric and at the inner edges of the reinforced areas of said fabric. However, when a fashioning cycle intervenes between two reinforced courses, during which the yarn carriers normally remain stationary, the formation of an abnormally large initial loop is noticeably frequent. The suggested immediate cause of such loops as appears to be as follows: there is a complete withdrawal of the noses of the sinkers and dividers from between the needles at one point in the fashioning cycle and as the noses of the sinkers and dividers are again moved between the needles in a further step in the fashioning cycle, the nose of the next sinker beyond the edge loop passes above the trailing end of yarn instead of beneath it. As a result, the yarn passes around said sinker as the yarn carrier begins its next yarn laying stroke, instead of directly around the needle, to form the abnormally large loops, hereinbefore referred to. While the abnormal loops are formed at the outside edges of the fabric and the inner reinforced edges, they are particularly objectionable at the inner reinforced edges inasmuch as the large loops are visible through the sheer single yarn area of the fabric. Other conditions may cause the yarn to pass beneath the nose of the sinker during fashioning cycles but no explanation will be attempted except as hereinbefore set forth.

To prevent such condition at the inner edges of the reinforced areas, the present invention provides that a yarn carrier which is standing in its normal position of rest at the beginning of a fashioning cycle shall be moved from said rest position in a straight line a distance of two needle spaces in its return direction, the distance from one divider to the next, to stand over the first divider within the area in which the yarn carrier lays yarn. This movement is in the direction toward the outer selvage edge and away from the center line of the fabric. The yarn length or bight from the fabric to the yarn carrier for the reinforcing yarn is thereby moved out of contact with the next sinker beyond the last loop but without increasing the length of the bight. As soon as the noses of the sinkers and dividers are again passed between the needles, the yarn carrier may be moved back to its original position so that the needle holding the loop at the edge of the reinforced area may form a loop in the following course in the usual manner.

A mechanism according to the invention for causing the movement of yarn carriers during fashioning cycles comprises, in addition to the usual movable stops and means for adjusting them, special cams acting during fashioning cycles to move yarn carriers a one divider distance only in the direction to lay yarn and back again to their normal positions at the ends of their strokes. Such movements of the carriers are timed to occur before and after the outward movement of the sinkers and dividers for stripping the loops down on the needles. In the arrangement shown, the well known reinforced selvage mechanism is employed and it is a feature of the present invention to utilize this mechanism in part to produce the desired movement of the yarn carriers for the reinforcing yarns.

Referring to the drawings more in detail, a yarn carrier 30 for laying a reinforcing yarn, sinkers 32, dividers 34, knockover bits 36, knitting needles 38, and fashioning points 40, all elements of a full-fashioned knitting machine, are shown in Figures 1 and 2 in positions which they assume immediately following the removal of the loops from the needles by the points in a usual fashioning cycle. The sinker-head 42 in which the sinkers and dividers reciprocate is shown in Fig. 2 but not in Figure 1. As is well understood, the machine has the sinkers 32 and dividers 34 arranged alternately. The yarn carriers such as 30 are always brought to rest above a divider because the dividers are notched out at their forward ends as indicated at 35 so that the yarn carrier may be brought lower and therefore closer to the level of the throats of the sinkers which act to draw yarn from the delivery tube 44 of the carrier 30 but without interference when there is relative movement between the dividers and the tube 44. As the fashioning points 40 act on loops near the selvages, it will be clear from Figs. 1 and 3 that the movement of the yarn carrier 30 just before the parts arrived at the positions shown in these figures was one toward the center line or single yarn area of the fabric, such movement occurring, of course, during a knitting cycle. At the end of a knitting cycle, the sinkers 32 and dividers 34 stand in the positions for the beginning of the next knitting cycle and the positions of the sinkers and dividers at such a time, that is before the sinkers are moved by the slur cam, is shown in Fig. 11, from which it will be seen that the sinkers and dividers project partially through the line of the needle row and that the trailing end or yarn bight between the delivery tube 44 and the fabric passes above the nose or nib of a sinker. Applying this to Figs. 1 and 3, the yarn bight leading from a loop 46 at the inner edge of reinforced area A shown in Fig. 3 initially passes above the nose of a sinker, the needle by which loop 46 was formed and on which the loop is shown, having a sinker between said needle and the tube 44. However, after loop 46 was knit, the machine was put into a fashioning cycle and in such cycles the sinkers and dividers are drawn back farther into the sinker-head 42 at a certain point in the cycle than is the case in a knitting cycle. At the point in the fashioning cycle shown in Figs. 1, 2 and 3, the catchbar (not shown) acting under the influence of the fashioning cams has begun to move the sinkers and dividers back into the sinker-head 42 so that the original relationship of the yarn bight between the fabric and the yarn tube 44 has been disturbed but, the carrier 30 not having moved, it is clear that the result of so withdrawing the sinkers and dividers into the sinker-head is to place the sinker in position where it may pass above the yarn bight instead of below when the sinker is thrust forward again.

In the position in the fashioning cycle assumed for Figures 1, 2 and 3, however, the fashioning points 40 have been engaged with certain needles in a way to lift the loops therefrom preparatory to transferring the loops to other needles, the heads of the needles in the meantime having come down into the knockover bits. At the moment in the cycle assumed for Fig. 5, a position later in the cycle than the position shown in Figs. 1, 2 and 3, the fashioning points and needles having reversed their downward motion, but the retrograde movement of the sinkers having continued, the lower ends of fashioning points 40 are above the knockover bits while the sinkers and dividers are behind the line of the fashioning points as well as behind the line of the needles. The points 40 are therefore free to move parallel to the needle row and this movement of the points therefore is performed at about the moment in the fashioning cycle assumed for Figs. 4, 5 and 6 to place the points in line in the draw-off direction with the needles to which the loops then on the points are to be transferred. For reasons that will presently appear, not long after the moment in the cycle assumed for Figs. 4, 5 and 6, the sinkers and dividers are brought forward out of the sinker-head 42 so as to stand above the fabric.

For this reason, the yarn carrier 30 for the reinforcing yarn is moved according to the invention from the position shown in Figure 1 where it stands over the divider next beyond the loop 46, to the position shown in Fig. 4 where said carrier is above the divider next inwardly of the loop 46. In this position, the sinker beyond edge loop 46 is free to come forward without disturbing the yarn bight between edge loop 46 and carrier 30. Therefore, between moments in the fashioning cycle represented respectively by Figs. 1, 2 and 3 on the one hand and Figs. 4, 5 and 6 on the other, the yarn carrier 30 is moved a distance equal to twice that between two next adjacent needles or, in other words, the distance between the two next adjacent dividers, in the direction toward the area A and toward the nearer selvage, this direction being away from the center line of the fabric as a whole.

The points 40 having been alined with the needles which are to receive the transferred loops, the points and needles are brought into contact and then down into the knockover bit bed. The sinkers are then brought forward to the position shown in Figs. 7, 8 and 9 in which the sinkers and dividers hold the fabric at the level of the lower edges of said sinkers and dividers, the points and needles then being raised rapidly to strip the loops off the fashioning points and down on the stems of the needles so that the loops are below the needle beards preparatory for a knitting cycle. Intermediate the moments in the fashioning cycle assumed for Figs. 4, 5 and 6 on the one hand and Figs. 7, 8 and 9 on the other hand the yarn carrier 30 is moved back to its initial position so that it again stands, as in Fig. 3, over a divider on the side of loop 46 toward the center line of the fabric. This involves again moving the yarn carrier a two needle distance or between adjacent dividers. The position of the yarn carrier 30 is therefore the same in Figs. 7, 8 and 9 as in Figs. 1, 2 and 3, but it is clear that the yarn bight from loop 46 to the carrier now extends across the upper edge of the sinker next beyond the loop 46. This is the correct position for the start of the next yarn laying stroke of carrier 30. As is evident from Fig. 10 as the carrier moves from its position in Fig. 7 in the direction to lay yarn, the yarn bight will be carried directly around the needle 38 forming loop 46 and across the upper edge of the divider next inwardly of the edge loop 46 and the sinker next beyond the edge loop 46 will have no effect on the yarn. There will, therefore, be no more than the ordinary amount of yarn presented to the needle on which loop 46 was formed and the loop knitted by this needle in the next course will be of only ordinary size and of normal appearance. This result is further illustrated in Figs. 10 and 11 in which the parts are shown in positions assumed by them shortly after the beginning of the next knitting cycle.

The means according to the invention whereby the yarn carrier 30 for laying reinforcing yarn is moved in the steps shown in Figs. 1 to 9 and described above is shown in Figs. 12–23, inclusive.

Referring to Figs. 12 and 13, there are shown therein a section through and a rear view of a portion of a full-fashioned knitting machine of the well-known Reading type which has novel means applied thereto in accordance with the invention, said means adapted to carry out the novel method disclosed herein. In said figures, only the moving parts necessary for the operation of the mechanism according to the invention have been shown. The remaining parts of this type of machine are well known to those skilled in the art and will not be referred to further. Aside from fixed parts, the mechanism shown in Figs. 12 and 13 comprises a known means for controlling the inner selvage stops for a yarn carrier for laying a reinforcing yarn together with the parts required in carrying out the present invention.

Said mechanism comprises the main shaft 50 and a pattern means 52 which includes usual means for shogging the cam shaft. On shaft 50 is a cam 54 adapted to deliver an impulse to a cam follower 56 pivoted on lever 58 whenever pattern means 52 operates to allow a tension spring 60 which is attached to the rear end of lever 58 to bias the lever in the direction to press follower 56 against cam 54. Except when a lever 62 which is normally in position to support the front end of lever 58 is moved by pattern means 52 out from under the lever 58, follower 56 is held at a level preventing cam 54 from having any effect. It will be understood that the lever 62 moves clockwise as viewed from the front of the machine as it withdraws from its supporting position. The pattern means 52 acts at desired times to withdraw lever 62 from beneath the end of lever 58 at approximately the point in the revolution of shaft 50 shown in Fig. 12 and at which point the follower 56 is at the high point of cam 54, it being understood that follower 56 is in the plane of cam 54 when the main shaft 50 is in the knitting position but not when the main shaft is in the position for fashioning. Therefore, as the cam turns from said high point, the follower 56 and lever 58 are drawn downwardly by spring 60. Lever 58 being pivoted at point 64, the effect of this downward motion of the follower is to raise a pivot 66 which is on the other side of pivot 62 from the follower. The motion of pivot 66 is transmitted by a link 68 upward to an arm 70 of a bell-crank lever 71, pivoted at 72 and which has a vertical arm 74 at the upper end of which is a pivot 76 whereby arm 74 of lever 71 is connected to the one end of links 78 and 80. The upward motion of link 68 turns lever 71 counterclockwise as viewed in Fig. 12, so that pivot 76 moves leftward from its position in Fig. 12. As best shown in Figs. 17 and 19, the other ends of links 78 and 80 are pivoted respectively to bell-crank levers 82 and 84 which are pivotally mounted on the shaft or spindle end 86 of a worm 88 (Fig. 13) for shifting the inner end stops for determining the amount of traverse of the yarn carrier rods for laying reinforcing yarns. As the pivot 76 moves leftward as viewed in Fig. 12, lever 82 is turned counterclockwise while lever 84 is turned clockwise. At the ends of their arms other than the ones connected to the links 78 and 80, bell-crank levers 82 and 84 have pivoted thereto racking pawls 90 and 92 respectively. Consequently, as the pivot 76 moves leftward as viewed in Figs. 12, 17 and 19, pawls 90 and 92 move respectively counterclockwise and clockwise. Pawls 90 and 92 cooperate with ratchets 94 and 96, respectively, which have oppositely disposed teeth whereby ratchet 94 is adapted to be turned clockwise and ratchet 96 counterclockwise, and it will be seen that said leftward movement of pivot 76 causes both pawls to move idly on their ratchets in the non-racking direction so as to engage each with another tooth, unless a means prevents one of the two from so doing.

Similarly, as cam 54 turns to again bring its high point into contact with follower 56, the pivot 76 is moved rightward or to the position shown in Figs. 12, 17 and 19. Thereby, both pawls are moved simultaneously in the direction to rack their ratchets. As the two pawls tend to turn spindle end 86 and worm 88 in opposite directions, a means is provided comprising a bluff or cam 98 which normally holds one of the pawls away from its ratchet but which may be shifted to hold the other pawl out of action (away from its ratchet) and to permit one or the other of said pawls to operate its ratchet and thereby the spindle. In order that cam 98 may lift the pawls 90 and 92 from their ratchets when the cam is in certain positions, pawl 90 has a lug 91 thereon and pawl 92 has a lug 93 thereon, Figs. 18, 19 and 23. Lugs 91 and 93 project in opposite directions from the pawls so that the cam 98 lying in a plane between those of pawls 90 and 92 contacts either lug 93 or lug 91 depending upon the position of the cam and one pawl or the other is therefore always out of action. Said cam 98 is pivotally mounted on the spindle end 86 and is normally held to lift pawl 92 away from the teeth of its ratchet 96 during a leftward movement of pivot 76 so that only pawl 90 will effect an angular rotation of spindle 86, equal to one ratchet tooth on each revolution of main cam shaft 50 in which follower 54 is permitted to follow the cam 54.

The worm 88, shown in Figs. 13 and 14, carries a nut 100 having an end stop 102 for a carrier rod 104 to which the yarn carrier is connected. Also carried in the nut 100 is a locking stop 106 for preventing rebound of rod 104. Except at the beginning of a yarn laying stroke of the rod 104 away from the nut 100, the rod is held against movement between the stops 102 and 106 by engagement of the stop 102 with a tappet 108 on the rod and by a wedge shaped lug 110 engaging the stop 106 at the ends of its traverses toward the nut.

Stop 102 is movable into and out of the path of the carrier rod 104 but when in the path of the carrier rod acts as a fixed stop. Stop 106 is spring pressed downward and yields upward as tappet 108 approaches the stop 102 because of a wedging action between lug 110 and a bevelled lower face on the stop 106. As the tappet 108 reaches stop 102, stop 106 drops behind lug 110 to hold rod 104 (Figs. 14 and 15). Stop 106 is also raised by mechanical means, not shown, in the usual manner preparatory to a movement of rod 104 away from stop 102. The stops 102 and 106 are only diagrammatically shown in relation to the nut 100 and it is to be understood that there is a plurality of each of stops 102 and stops 106 for cooperation with a plurality of carrier rods such as 104 in the usual and well known manner.

The action of said pawl 90 has been described and this pawl moves spindle 86 and worm 88 to move the nut 100 and stop 102 "outward," that is in the direction toward the near outer selvage edge of the fabric and away from the center line of the fabric, thereby narrowing the area to which a yarn carrier such as 30 lays yarn. In order that nut 100 and stop 102 may move in the other direction to widen the area to which carrier 30 lays yarn, means is provided whereby cam 98 may be swung to release pawl 92 for action and to throw pawl 90 out of action. For this purpose, cam 98 has two spaced fingers 111 thereon whereby cam 98 may be swung with respect to spindle end 86. To this end, a pin 112 fixed in an arm 114 pivotally carries a slotted yoke 113 in position to extend between fingers 111, Figs. 17 and 23. Arm 114 forms part of a bell-crank lever 116, a second arm 118 of which extends rearward and has a contact portion 120 adjustably fixed thereon and which rests on a plate 122 adjustably fixed at the end of an arm 124, Figs. 12 and 13. A spring 125, shown in Fig. 13 but omitted in Fig. 12 for purpose of clarity, serves to keep parts 120 and 122 normally in contact. Arm 124 is fixed in turn to a horizontal shaft 126 journalled at the ends of suitable brackets fixed to the frame of the machine, as shown in Fig. 12. Shaft 126 extends from the rear to the front of the machine and at its front end has a second off-setting arm 128 the lower end of which has a flange 129 thereon adapted to contact a second vertical lever 130 also controlled directly by the pattern means 52, a spring 131 connected between a point on arm 124 and a point on the frame normally biasing the flange 129 against the upper end of lever 130. Therefore, so long as lever 130 remains in the position shown in Fig. 12, its normal position, arm 128 is supported laterally against the tension of spring 131 and thereby the positions of the parts in the train of mechanisms from arm 128 back to pin 112 and fingers 111 remain in the position of Fig. 17, so that the position of cam 98 also remains the same and consequently pawl 90 remains in the position to turn spindle 86 but pawl 92 cannot do so. When it is desired that pawl 92 should become effective, a button on the pattern chain (not shown), ordinarily a part of the pattern means 52, acts to move lever 130 and arm 128 to overcome spring 131 and thereby to turn shaft 126 to draw arm 124 downward. Cam 98 thereby is moved by pin 112 so that pawl 92 is rendered effective and pawl 90 is put out of action. At the same time the pattern means 52 operates arm 128 by moving lever 130, the pattern means also moves lever 62 to release lever 58 because lever 130 has a lug 132 fixed thereon and projecting laterally in front of lever 62, Fig. 12, so that lever 62 always moves when lever 130 moves, although lever 62 is free to move without disturbing lever 132. Lever 58 having been released, an impulse is therefore transmitted to pawl 92 to turn worm 88 and thereby to move nut 100 and stops 102 and 106 "in" or in the direction to lengthen the travel of yarn carrier 30 and thereby widen the area to which it lays yarn.

Further, as to the operation of pawls 90 and 92 and the cam 98 with respect to the ratchets 94 and 96 for said pawls, it will be understood that as pivot 76 moves leftward as viewed in Figs. 12 and 17, assuming cam 98 is in the position shown in Fig. 18, pawls 90 and 92 both move, pawl 90 counterclockwise and pawl 92 clockwise, as shown in Figs. 21 and 22 respectively. Both pawls, therefore, move away from the teeth with which they are shown in contact in Figs. 18 and 19 and this movement is sufficient to cause pawls 90 and 92 to drop in behind a new tooth. Cam 98, however, is in position, as shown in Fig. 18, to contact lug 93 to hold pawl 92 at this point just outside the circle described by the teeth of its ratchet 96, as shown in Fig. 22, and permit pawl 90 to engage a tooth of its ratchet 94 (Fig. 21). Consequently, as the pivot 76 reverses and begins to move rightward, pawl 90 moves ratchet 94 clockwise while pawl 92 misses the tooth nearest it and, owing to the fact that the tip of the pawl and the tip of the next tooth are moving in opposite directions, pawl 92 is held out by cam 98 to cause the pawl to also miss the tip of the tooth initially engaged by it as ratchet 96 is moved in the clockwise direction with ratchet 94 and to come to rest against a following tooth. At the end of such racking and idling strokes, therefore, the parts come to rest in the relative positions shown in Figs. 18, 19 and 20 in which pawl 92 acts as a stop to prevent overrunning in the clockwise direction. The specific action of the parts when pawl 92 is active and pawl 90 held out of action will be obvious from the foregoing.

It will be seen therefore that cam 98, the pattern controlled lever 130 and the intervening train of mechanism shown as comprising, beginning at cam 98, elements 111, 116, 126, 128, 129 and others, constitute a discriminating mechanism controlling the direction of movement of the stops for the reinforcing carriers in response to the impulses from a cam or cams on the main cam shaft, such a cam being shown at 54.

At times, it is desired to turn spindle 88 manually to reset the stops such as 102 and 106 and, to permit such manual operation, a member 133 is provided, member 133 being pivotally mounted on spindle 86 and having cam portions 134 and 136, as shown in Figs. 20 and 23. Member 133 is also provided with a handle 138. During machine operation of worm 88, handle 138 is latched in the position shown in Fig. 20 by a latch pin 140 which engages in a hole in a plate 142, the plate having two holes one of which appears at 144. Thereby the cams are retained in an ineffective position as long as desired. However, cam portions 134 and 136 are so placed that their planes intersect the lugs 91 and 93, respectively. Therefore, in order to turn spindle 86 manually, latch pin 140 of handle 138 is released temporarily from plate 142 and the handle rotated counterclockwise as viewed in Figs. 12 and 20 to engage the pin 140 in the hole 144 at the left side of plate 142, thereby moving cam portions 134 and 136 into contact with lugs 91 and 93 respectively to disable or render ineffective both pawls 90 and 92 by moving them outside the circles described by the ends of the teeth of their ratchets. Spindle end 86 and worm 88 may then be turned by a handle 146 through a usual sprocket and chain device 149, shown in dot and dash outline in Fig. 12 in either direction. The mechanism hereinabove described with respect to Figs. 12–23 inclusive will be understood to be old, being disclosed in the catalogue of the Textile Machine Works, copyrighted in 1947.

A further known feature shown in the drawings is a safety means for preventing the pawls 90 and 92 from being operated when the stops 102 reach a predetermined limit of travel in either direction. For this purpose, a bracket 141 (Fig. 13) is connected to the nut 100, the bracket having sliding engagement with a rod 143 fixed to the machine frame. Bracket 141 has an arm 145 the lower end of which is adapted to engage tappets 148 on a rod 147 one on each side of arm 145, so that as the nut 100 reaches a desired limit in one direction or the other, rod 147 will be moved. Movement of rod 147 in either direction to a certain extent operates a means for preventing the operation of both of pawls 90 and 92. Said preventing means comprises a depending lever 150 pivotally carried at 152 on the machine frame (Fig. 13) and pivotally connected at 151 to the rod 147. The lower end of lever 150 is bifurcated as shown in Fig. 16 to form fingers 154. Fingers 154 are adapted to engage a portion 160 (Fig. 16) at the rear end of the lever 58 of the means for racking pawls 90 and 92 for worm 88. Whenever rod 147 is moved, lever 150 is swung so that one of the fingers engages the portion 160. Whenever this occurs, a movement of lever 62 by the pattern means 52 has no effect because lever 58 is prevented from following cam 54 to deliver an impulse to racking pawls 90 and 92.

When an idle movement is to be given to a reinforcing yarn carrier such as 30 in accordance with the invention, the main cam shaft 50 is put into a fashioning cycle by shogging it toward the right as viewed from the front of the machine. The cam follower 56 is thereby shifted from cam 54 to the plane of a cam 162 and, at the same time, prior to shifting of the cam shaft 50, the lever 62 is moved out from under the forward end of lever 58 by the pattern means 52, so that follower 56 may follow cam 54 from the high point to the low point of said cam in the usual manner, shaft 126 and therefore cam 98 remaining in the position shown in Figs. 12, 17 and 18 because lever 130 has not been moved. As the cam shaft 50 is shogged the follower 56 is moved from the cam 54 onto cam 162 approximately at the low point 163 as shown in Fig. 12. The pawls 90 and 92 therefore being in the position shown in Figs. 12, 17 and 19 and the cam 98 being in the position shown in Figs. 18 and 19, pawl 90 is free to act but pawl 92 is disabled. When the follower 56 reaches the low point of cam 54 and is moved to the cam 162 at the point 163 the lever 58 has moved the pawls 90 and 92 away from the teeth which they are shown as contacting in Figs. 18 and 19, pawl 90 falling in behind a new tooth while pawl 92 is prevented from so doing by cam 98 as best shown in Fig. 22. Low section 163 extends around the perimeter of cam 162 for a considerable angular distance, the heighth of the cam beginning to increase at point 166 so as to give pawl 90 a racking movement terminating at a high point 168. The yarn carrier 30 is thereby moved from the position in which it is shown in Figs. 1 and 3 to that in which it is shown in Figs. 4 and 6. Yarn carrier 30 remains in this position for the period required for the cam 162 to turn from point 168 to a second low point 170. At this point in the cycle, pivot 76 is again moved to its leftward position from the position of Fig. 12. If now it reverses its direction of movement without changing the position of cam 98 from that shown in Figs. 18 and 19, yarn carrier 30 would be given a second movement away from its position as shown in Figs. 1 and 3, whereas it is desired to restore the yarn carrier to its original position by moving it from its position as shown in Fig. 4 to that shown in Figs. 7 and 9, in other words, the same position as in Figs. 1 and 3.

It will be seen that cam 162 increases in height from low point 170 to a second high point 171 so that a racking impulse will be delivered to the one of pawls 90 and 92 whichever is in active position. As it is impractical to shift lever 130 by the pattern means 52 in the midst of a narrowing revolution of shaft 50, means are provided in accordance with the invention for shifting the cam 98 from the position in which it is shown in Figs. 18 and 19 to one in which it holds pawl 90 out of operation and permits pawl 92 to engage a tooth of ratchet 96 in the period in which cam 162 moves from point 168 to point 170. To this end, there is shown a means including a cam 172 on shaft 50. Cam 172 is arranged to deliver an impulse to a cam follower 174 rotatably mounted at the forward end of a lever 176 which is pivoted at 178 intermediate its ends. At the rear end, lever 176 has a horizontal contact plate 180 adjustably mounted thereon. Lever 176 delivers an impulse when operated to one arm 182 of a bell-crank lever 184. Arm 182 has a tappet 183 adjustably mounted thereon and held normally in contact with plate 180 by a spring 188 (Fig. 13) so that an impulse from follower 174 is transmitted to bell-crank lever 184 without lost motion. A second arm 186 of the bell-crank lever 184 has a sliding and pivotal connection with one end of a link 189, the other end of which is connected at point 190 with an arm 192 which depends from the arm 124 on the shaft 126. The arm 186, of the bell-crank lever 184, engages a collar 191 on the link 189 to transmit its motion through the link to the arm 192. Further, the sliding connection between the arm 186 and the link 189 permits the link to slide relative to the arm when the shaft 126 and arm 124 are controlled from the pattern means as hereinbefore set forth. Therefore, when cam 172 delivers an impulse to its follower 174, it is transmitted through lever 184, link 189 and arm 192 to arm 124. Arm 124 is thereby turned clockwise as viewed in Fig. 13 and arm 114 turned counterclockwise as viewed in Fig. 12 to shift yoke 113 and fingers 111 clockwise as viewed in Figs. 12, 17 and 18 to turn cam 98 to disable pawl 90 and to render pawl 92 effective. Therefore, the impulse delivered by cam 162 as follower 56 rides up on this cam from point 170 to point 171 is effective to move yarn carrier 30 in the desired direction; that is to say, toward the center line of the fabric and to its original position as shown in Figs. 7 and 9.

It will be understood that only the left selvage attachment is shown in the drawings but the cycle of movements described hereinabove is simultaneously repeated by the right selvage attachment. However, when the carrier 30 for the left attachment is at the inner edge of the left reinforced area A, the carrier for the right reinforced area (not shown) is at the right of the stocking blank, and outside the edge loop of the right selvage. Therefore, only the left selvage attachment controls the left reinforcing carrier and the right selvage attachment, which is at the inner edge of the right reinforced area, moves idly without affecting the position of the right carrier. When the reinforcing carriers are at the opposite ends of their travel, the right reinforcing carrier will be moved by the right selvage attachment as described hereinabove with respect to the left reinforcing carrier 30 and the left attachment will move idly without affecting the left carrier.

Of course, the improvements specifically shown and described by which the above results are obtained can be changed and modified in various ways without departing from the invention herein disclosed and hereinafter claimed.

What I claim is:

1. In a method of fashioning full-fashioned knit fabric to prevent the formation of unduly long and unsightly loops at the point of reversal of a yarn carrier, the steps comprising reversibly moving a carrier in a coursewise path, holding the carrier against movement during fashioning cycles at a point of reversal of the movement of the carrier, moving the carrier during fashioning cycles for two needle distances only from its initial position of rest in the direction to lay yarn but prior to the coming forward in such cycles of the sinkers and dividers to strip the loops down on the needles, bringing the sinkers and dividers forward and then moving the yarn carrier back to its initial position of rest before beginning the coulier stroke for the next knitting cycle.

2. In a method of fashioning reinforced full-fashioned knit fabric, the steps comprising moving a yarn carrier for a body yarn from selvage to selvage of the fabric during knitting cycles, moving a pair of carriers for reinforcing yarns during knitting cycles in the same direction as said first carrier to form a pair of reinforced areas, one carrier of said pair moving from a point outside a selvage to a point toward the center line of the fabric from the line of the inner edge of its reinforced area, and the other carrier of the pair moving from a point toward the center of the fabric from the line of the inner edge of its reinforced area to a point outside the other selvage, moving during a fashioning cycle the one of said pair of yarn carriers which is standing between the line of the inner edge of its reinforced area and the center line of the fabric toward the selvage nearer thereto to a point in line walewise with the reinforced area for a period in the cycle in which the sinkers and dividers come out to hold the fabric loops, and then moving said last mentioned carrier toward the center line of the fabric before the time for the start of its yarn laying movement in the next knitting cycle after the fashioning cycle.

3. The method of operating a yarn carrier for laying reinforcing yarn in the knitting of a full-fashioned fabric comprising bringing said carrier to rest above a divider at the end of a yarn laying stroke and between the edge of the area reinforced by the yarn delivered by the carrier and the center line of the fabric, knitting the yarn delivered during said stroke to form a course of loops, lifting loops of said course on fashioning points, shifting said points parallel to the needle row and bringing the points down, moving said carrier in a straight line from above said divider and bringing it to rest above a second divider a two needle distance toward the nearer outside selvage, then bringing the sinkers and dividers forward above the fabric, raising said points and moving the yarn carrier, while said sinkers and dividers are above the fabric, to a position above said first mentioned divider in preparation for another yarn laying stroke.

4. In a full-fashioned knitting machine, the combination with a reinforced selvage attachment having end and rebound stops for a yarn carrier for a reinforcing yarn adapted to move together, of a means for moving said stops during fashioning cycles comprising a cam having a high point, a low point and a second high point for delivering an impulse, means for delivering said impulse to said stops comprising a pair of pawls moved in opposite directions by said impulse, a cam normally set to disable one of said pawls to prevent it from moving said stops while permitting the other of the two pawls to operate to move the stops, said first mentioned cam having a second low point between its said high points whereby it delivers a second impulse to said pawls during a complete revolution of the cam, and a pattern controlled means for shifting said disabling cam in the period between the end of said first impulse and the beginning of the second impulse to disable said other pawl and to cause said one pawl to act and thereby to move said stops in the opposite direction to restore the stops to the position occupied by them before said first impulse from said first cam.

5. In a full-fashioned knitting machine having knitting elements including a needle row, alternately arranged sinkers and dividers, a yarn carrier for laying reinforcing yarn, end and rebound stops for said carrier adapted to move together, and a means for moving and holding said stops to determine the positions of said carrier in a series of courses in which it lays reinforcing yarn to define the position of the line of the edge of the reinforced area on the side toward the center of the fabric, the combination with said elements and means of a means acting during fashioning cycles only comprising a means including a main cam shaft, a cam on said cam shaft for delivering an impulse to move said stops while the sinkers and dividers are free of the fabric to move said carrier from a position on a walewise line at the side of the reinforced area toward the center line of the fabric to a position on a walewise line running through the reinforced area, and a means for delivering also in said fashion cycle an impulse to move said stops to move the carrier back to said first position.

6. In a full-fashioned knitting machine having knitting elements including a needle row, alternately arranged sinkers and dividers, a yarn carrier for laying reinforcing yarn, end and rebound stops for said carrier connected to move together, and a means including a main cam shaft for moving and holding said stops to determine the position of said carrier in a series of courses in which it lays reinforcing yarn to define the position of the line of the edge of the reinforced area on the side toward the center line of the fabric, the combination with said elements and means of a means acting during fashioning cycles only comprising a means including said main cam shaft, a cam on said cam shaft for delivering an impulse to move said stops while the sinkers and dividers are at the rear of the line of the needle row to move said carrier from a position on a walewise line at the side of the reinforced area toward the center line of the fabric to a position on a walewise line running through the reinforced area, and a means including said cam for delivering also in said fashioning cycle an impulse to move said stops to move the carrier back to said first position while the sinkers and dividers are forward of the needle row to hold down the fabric and comprising a second cam on the main cam shaft and a cam follower for the second cam arranged to contact therewith for only a relatively small portion of a revolution.

7. In a full-fashioned knitting machine having knitting elements including a needle row, alternately arranged sinkers and dividers, a yarn carrier for laying reinforcing yarn, end and rebound stops for said carrier connected to move together, and a means for moving and holding said stops to determine the positions of said carrier in a series of courses in which it lays reinforcing yarn to define the position of the line of the edge of the reinforced area on the side toward the center of the fabric, the combination with said elements and means of a means acting only during fashioning cycles, comprising a pattern controlled means and including a main cam shaft, a cam on said cam shaft for delivering an impulse to move said stops while the sinkers and dividers are at the rear of the line of the needle row to move the carrier from a position on a walewise line at the side of the reinforced area toward the center line of the fabric to a position on a walewise line running through the reinforced area, and a means including said cam for delivering also in said fashioning cycle an impulse to move said stops to move the carrier back to said first position while the sinkers and dividers are forward of the needle row to hold down the fabric.

8. In a full-fashioned knitting machine having knitting elements including a needle row, alternately arranged sinkers and dividers, a yarn carrier for laying reinforcing yarn, end and rebound stops for said carrier connected to move together, and a means for moving and holding said stops to determine the position of said carrier in a series of courses in which it lays reinforcing yarn to define the position of the line of the edge of the reinforced area on the side toward the center line of the fabric, the combination with said elements and means of a means acting during fashioning cycles only comprising a means including a main cam shaft, a cam on said shaft for delivering an impulse to move said stops while the sinkers and dividers are at the rear of the line of the needle row to move said carrier from a position on a walewise line at the side of the reinforced area toward the center line of the fabric to a position on a walewise line running through the reinforced area and comprising a pair of pawls acting at different times and in opposite directions and a bluff normally acting to hold one of said pawls out of action, and a means including said first cam for delivering also in said fashioning cycle an impulse to move said stops to move the carrier back to said first position while the sinkers and dividers are forward of the needle row to hold down the fabric and comprising a pattern controlled train for shifting said bluff to release said one pawl and to hold the other of said pair of pawls out of action, a second cam on the main cam shaft and a cam follower for the second cam arranged to contact therewith for only a relatively small portion of a revolution.

9. In a full-fashioned knitting machine having a reinforcing yarn carrier, a carrier bar for said carrier, and end and rebound stops for respectively stopping the carrier just beyond the edge of the fabric area to which it lays yarn and for preventing a rebound from the end stop, and means to rack said stops in either direction at the ends of knitting cycles, the combination of a cam automatically put into action in fashioning cycles and delivering two impulses to said racking means in a fashioning cycle, the racking means including a discriminating means causing the racking means to move said stops to carry the yarn carrier a short distance on the other side of said edge of the reinforced area upon receiving the first of said impulses by said cam, and a cam and connections therefrom to said discriminating means acting on the discriminating means to cause the racking means to return the stops to their first positions upon receiving the second impulse from the first mentioned cam.

10. In a full-fashioned knitting machine the combination of a cam having two low and two high sectors for generating impulses and acting during fashioning cycles of the machine, a second cam acting only during a short portion of fashioning cycles of the machine and a train of elements receiving impulses from said second cam and delivering the impulses of the second cam at a point at which they alter the effect of impulses generated by said first cam.

11. In a method of knitting full-fashioned fabric to prevent the formation of unduly long loops at an inner selvage of a reinforced fabric, the steps comprising moving a reinforcing yarn carrier from a point in walewise alinement with a non-reinforced area alongside the edge of a reinforced area of fabric to a point on the other side of said edge and returning the carrier to said first side of the edge, all between two successive knitting cycles.

12. In a method of operating a full-fashioned knitting machine having a reinforcing yarn carrier and adapted to knit fabric having a reinforced area, the steps comprising moving a reinforcing yarn carrier from a position in a walewise alinement with a non-reinforced area adjacent a reinforced area of fabric to a position in walewise alinement with said reinforced area and back to said first position, all between the end of one knitting cycle and the beginning of the next.

13. In a method of operating a full-fashioned knitting machine having a reinforcing yarn carrier and adapted to knit fabric having a reinforced area, the steps comprising moving a reinforcing yarn carrier from a position in walewise alinement with a non-reinforced area alongside a reinforced area of fabric to a position in walewise alinement with said reinforced area and back to said first position while regulating the carrier movements to prevent drawing yarn during the movements.

14. In a method of operating a full-fashioned knitting machine having a reinforcing yarn carrier and adapted to knit fabric having a reinforced area, the steps comprising moving a reinforcing yarn carrier from a position in walewise alinement with a non-reinforced area alongside a reinforced area of fabric to a position in walewise alinement with said reinforced area and back to said first position during a fashioning cycle of the machine.

15. In a method of operating a full-fashioned knitting machine having a reinforcing yarn carrier and adapted to knit fabric having a reinforced area, the steps comprising moving a reinforcing yarn carrier from a position in walewise alinement with a non-reinforced area alongside a reinforced area of fabric to a position in walewise alinement with said reinforced area and back to said first position during a fashioning cycle of the machine and all while regulating said movements to prevent drawing yarn.

16. In a method of operating a full-fashioned knitting machine having a yarn carrier for reinforcing yarn and end and rebound stops for said carrier, the steps comprising bringing the reinforcing yarn carrier to rest at the end of a yarn laying stroke at a point in walewise alinement with a non-reinforcing area of fabric, holding the reinforcing carrier by the end and rebound stops, and moving said stops simultaneously and equally first in one direction and then in the other between two yarn laying movements to move the reinforcing yarn carrier to a point in walewise alinement with a reinforced area of fabric and back to said rest position and controlling the movements of said stops to prevent drawing reinforcing yarn during said movements of said yarn carrier.

17. In a method of operating a full-fashioned knitting machine having a yarn carrier for reinforcing yarn and end and rebound stops for said carrier, the steps comprising bringing the reinforcing yarn carrier to rest at the end of a yarn laying stroke in walewise alinement with a non-reinforced area of fabric, holding the reinforcing carrier by the end and rebound stops, putting the machine into a fashioning cycle, and moving said stops simultaneously and equally during said fashioning cycle first in one direction and then in the other to move the reinforcing yarn carrier to a point in walewise alinement with a reinforced area of fabric, and then in other direction to said point of rest, and controlling the movements of said stops to prevent drawing reinforcing yarn during said movements of said yarn carrier.

18. In a full-fashioned knitting machine, in combination, a needle bank, a yarn carrier for laying reinforcing yarn, means bringing said carrier to rest a short distance beyond the last needle going in the direction of its yarn laying stroke to which the carrier has laid yarn in said stroke, means to put the machine into a fashioning cycle, and pattern controlled means constructed and arranged to first move said yarn carrier in the opposite direction of its movement in said stroke and to stop the carrier on the other side of said needle from said rest position and then to return it to the rest position prior to the beginning of the next cycle of the machine.

19. In a full-fashioned knitting machine, in combination, a needle bank, alternately arranged sinkers and dividers, a yarn carrier for laying reinforcing yarn, means to bring said carrier to rest a short distance beyond the sinker next to the last needle to which the carrier has laid yarn going in the direction of its yarn laying stroke, means to put the machine into a fashioning cycle, and means operable during the fashioning cycle to move said yarn carrier to the other side of said sinker from said position of rest and to stop the carrier on said other side and means operable of a later stage of the fashioning cycle to return the carrier to said rest position.

20. In a full-fashioned knitting machine, the combination of sinkers and dividers arranged alternately, a yarn carrier for laying reinforcing yarn, means including end and rebound stops for bringing said carrier to rest a short distance beyond the sinker next to the last needle going in the direction of the carrier's yarn laying stroke to which the carrier has laid yarn, means to put the machine into a fashioning cycle, and pattern controlled means, operable during the fashioning cycle, for moving said stops to move said carrier to the other side of said sinker from said position of rest and to stop the carrier on said other side, and pattern control means operable at a later stage in the fashioning cycle to return the carrier to said rest position.

21. In a full-fashioned knitting machine having a yarn carrier for laying reinforcing yarn, sinkers and dividers arranged alternately, a head in which said sinkers reciprocate, a yarn carrier for laying reinforcing yarn, means for bringing said carrier to rest a short distance beyond the sinker next to the last needle going in the direction of the carrier's yarn laying stroke to which the carrier has laid yarn and means to put the machine into a fashioning cycle, the combination with carrier, sinkers, dividers and said means of means adapted to move said carrier in a straight coursewise line from said rest position to the other side of said sinker at a time in the cycle in which the sinkers are withdrawn into their head to the end of their path, to then stop the carrier and to afterward return the carrier to rest position all in the fashioning cycle comprising a pair of pawls acting at different times and in opposite directions, a cam normally acting to hold one of said pawls out of action, said other pawl adapted when free of the cam to deliver an impulse to cause said carrier to carry out said movement away from its position of rest, and pattern controlled means to shift said cam, said one pawl then adapted to deliver an impulse to cause said carrier to carry out said return movement to its position of rest.

22. In a full-fashioned knitting machine the combination comprising a reciprocable yarn carrier rod, a yarn carrier supported thereby for movement therewith, means to reciprocate said rod and carrier during a knitting cycle of the machine to lay a reinforcing yarn from a selvage edge to an inner edge of a reinforced area, stop means to temporarily control movements of said rod at the end of said yarn laying stroke, means on the machine for performing a fashioning cycle, means for moving said stop means during the fashioning cycle to shift said carrier from a normal stopped position beyond the inner edge of said reinforced area to a position toward said selvage, and means for moving said stop means at a later stage in the fashioning cycle to shift said carrier back to said normal position.

23. In a full-fashioned knitting machine the combination comprising a reciprocable yarn carrier rod, a yarn carrier supported thereby for movement therewith, means to reciprocate said rod and carrier during knitting cycles of the machine to lay a reinforcing yarn from a selvage edge to an inner edge of a reinforced area, movable end and rebound stops positioned to temporarily control movements of said rod at the end of said yarn laying stroke, means on the machine for performing a fashioning cycle, means for moving said end and rebound stops simultaneously during a fashioning cycle to shift said carrier from a normal stopped position beyond the inner edge of the reinforced area to a position toward the selvage and means for moving said stops at a later stage in the fashioning cycle to shift the carrier back to said normal position.

KURT G. ESCHE.

REFERENCES CITED

The following references are of record in the file of this patent:

UNITED STATES PATENTS

| Number | Name | Date |
|---|---|---|
| 481,351 | Gee | Aug. 23, 1892 |
| 2,402,200 | Mack | June 18, 1946 |
| 2,489,141 | Kaul et al. | Nov. 22, 1949 |

FOREIGN PATENTS

| Number | Country | Date |
|---|---|---|
| 30,301 | Germany | Jan. 29, 1885 |